G. L. WHEELER.
AUTOMATIC FENDER.
APPLICATION FILED FEB. 20, 1911.
998,141.
Patented July 18, 1911.
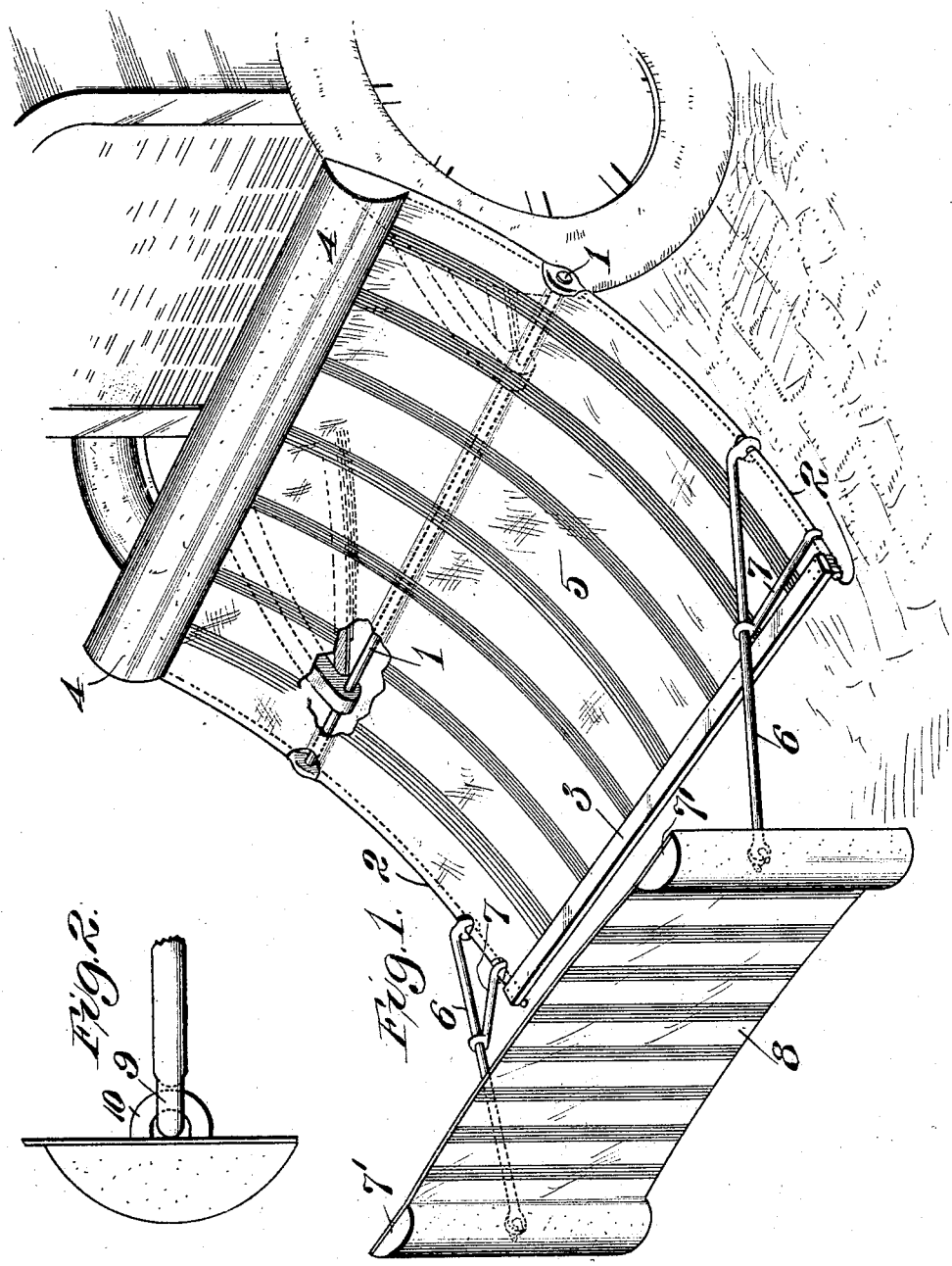

UNITED STATES PATENT OFFICE.

GEORGE L. WHEELER, OF ST. LOUIS, MISSOURI.

AUTOMATIC FENDER.

998,141. Specification of Letters Patent. Patented July 18, 1911.

Application filed February 20, 1911. Serial No. 609,599.

*To all whom it may concern:*

Be it known that I, GEORGE L. WHEELER, a citizen of the United States, and resident of St. Louis, Missouri, have invented certain new and useful Improvements in Automobile-Fenders, of which the following is a specification containing a full, clear, and exact description, reference being had to the accompanying drawings, forming a part hereof.

My invention relates to improvements in automobile fenders, and the object of my invention is to construct a simple, durable, neat and automatic fender which may be readily applied to an ordinary automobile and which is poised to carry in a condition to operate and arranged so that after it is once operated the fender will automatically assume its original position.

With the above purposes in view my invention consists in certain novel features of construction and arrangement of parts as will be hereinafter more fully described, pointed out in the claims and illustrated by the accompanying drawing, in which—

Figure 1 is a perspective view illustrating my invention as applied to an ordinary automobile; and Fig. 2 is a detail, fragmental view illustrating a portion of the connection between the fender proper and the auxiliary fender.

Referring by numerals to the accompanying drawings: 1 designates a rod which supports the entire fender. This rod, as shown, is preferably carried by the forward ends of the automobile springs.

2—2 designate rods which constitute the side members of the frame of the fender proper, each of which is provided with a bearing through which the rod 1 is inserted so that the rods 2 may rock.

3 designates the forward frame member of the fender proper, and 4 the rear frame member of the fender proper which is preferably enlarged and cushioned and possessed of sufficient weight to balance the forward end of the fender proper and its attachments. The fender proper is normally poised so that its forward end will ride clear of the road-way.

5 designates a sheet of flexible material such as heavy canvas which covers the entire frame of the fender proper and which is designed to support and carry an object or person struck by the fender. Projecting forwardly from and supported by the side members 2 of the frame proper are rods 6, which incline forwardly and upwardly and are maintained in said positions by the supporting rods 7, which connect the rods 6 with the side members 2 of the main frame of the fender. Pivoted to the forward ends of the rods 6 are the rigid frame members 7' of the auxiliary fender, the forward faces of these members being cushioned and the members 7 being connected with a sheet 8 of flexible material, such as heavy canvas. In the forward end of each of the rods 6 there is an eye 9 and connecting said eyes with the rigid members 7' of the auxiliary fender are the staples 10 which are located above the vertical centers of the rigid members 7' so that the auxiliary fender is normally carried in a vertical position.

Assuming an automobile to be equipped with my improved fender, and a person struck by the forward or auxiliary fender, it is obvious that, by reason of the pivotal mounting of the auxiliary fender, it may be tilted rearwardly so that it will be not necessary for the body of the person struck to be tilted or fulcrumed over the top of the fender, but be easily swung into the main fender. It will furthermore be obvious that at the time the person is struck the weight of the person's body will throw the entire fender downwardly toward the road-way so as to preclude the possibility of the person's body getting underneath the fender.

By reason of the weight of the member 4 of the fender proper, which is in excess of that portion of the complete fender in advance of the pivotal point, there is a preponderance of weight to the rear of the pivotal point which will automatically cause the fender to again assume its normal operative position after it has been operated.

I claim:

1. In an automobile fender, a fender proper comprising a frame pivotally mounted to a suitable support in advance of the automobile body, rods constituting forward extensions of said fender frame, an auxiliary fender pivotally supported upon the forward ends of said rods and poised to normally carry in a vertical position, the fender frame proper having a preponderance of weight to the rear of its pivotal point, for the purposes stated.

2. In an automobile fender, a fender proper comprising two side rods pivotally mounted to a suitable support in advance of the automobile body, rigid front and rear members connecting the side rods and a flexible sheet secured to said rods and rigid members, a forward extension of the frame of the fender proper and an auxiliary fender comprising rigid end members and a flexible member connecting the rigid members and pivotally connected with said frame extensions to normally carry in a vertical position, the fender frame proper having a preponderance of weight to the rear of its pivotal point.

In testimony whereof, I have signed my name to this specification, in presence of two subscribing witnesses.

GEORGE L. WHEELER.

Witnesses:
E. L. WALLACE,
N. G. BUTLER.